Dec. 20, 1927.   J. SERRA SIÓ   1,653,475
SPINDLE BEARING
Filed Sept. 8. 1924
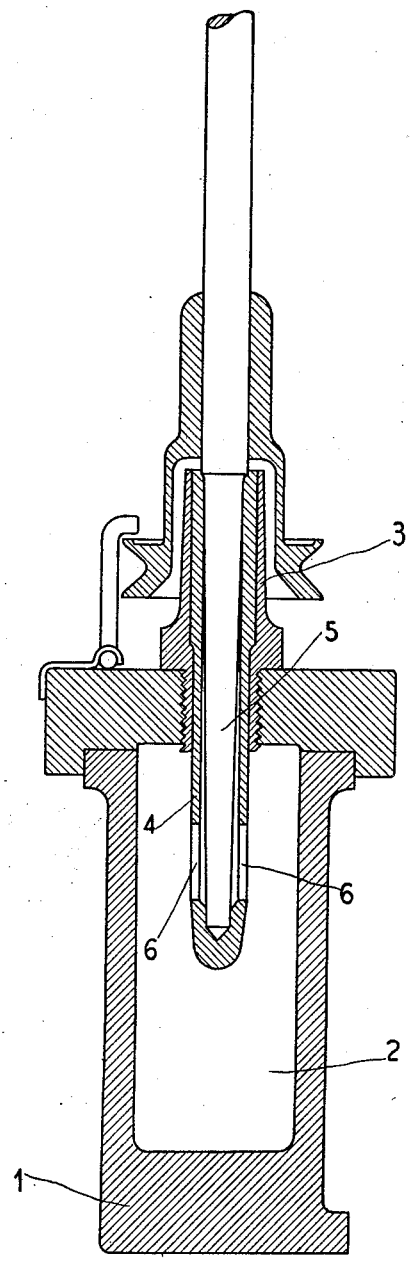
Inventor
José Serra Sió
by Wm. H. Babcock & Son
Attorneys Patented Dec. 20, 1927.

1,653,475

UNITED STATES PATENT OFFICE.

JOSÉ SERRA SIÓ, OF BARCELONA, SPAIN.

SPINDLE BEARING.

Application filed September 8, 1924. Serial No. 736,628.

This invention relates to spindle bearings in spinning looms wherein the bolsters carrying the spindles constitute oil reservoirs in which the perforated or slotted lower end portions at least of the spindles and their supporting bearing sleeves are immersed.

The primary object of the invention is to provide in a loom of this type, a ferrule or bearing sleeve 3 having an externally screw-threaded shank to screw into the correspondingly threaded bore in the top of the bolster, as illustrated, or equivalent, said sleeve having an upwardly flaring bore, preferably gently reduced or shouldered just above the upper end of the shank, all as shown, in combination with a removable end-thrust or suspension bearing, such as 4, having its lower portion of a cross-sectional size and shape such as to pass through the bore in said supporting sleeve 3 and the external wall of its upper portion tapering from its upper end toward its lower end and corresponding in degree of taper to the taper of the bore in sleeve 3 and of such cross-sectional size as to fit snugly in the tapered portion of the bore in sleeve 3 so as to hold said end-thrust or suspension bearing suspended in said sleeve 3, to the end that the bearing may be removed by a straight pull upward with a single motion of the hand, or equivalent operation, thus greatly facilitating the removal of such bearings, so that the longitudinally extending oil reservoirs or passages in the respective bolsters of the looms may be left unobstructed so as to be easily cleaned out or wiped out by shoving or pulling a mop or swab therethrough, the ferrules or bearing sleeves 3, bolster and bearings 4 being so combined that the bearings 4 are the only parts that extend or protrude substantially into the interior of said reservoir below the lower face of the top of the bolster, the ends of the sleeves 3 being substantially flush therewith and in no event extending to any such degree as to in any appreciable degree obstruct the passage through said reservoir or chamber of a cleaning or wiping mop, cloth or swab or tools.

Further, the tapering construction results in the automatic and perfect centering of the end thrust or suspension bearing 4 in the sleeve 3, and, consequently, in the perfect centering of the spindle 5, an end long sought.

In the drawing I have illustrated a vertical sectional view of a construction embodying my invention.

Referring now in detail to the drawing, the bolster 1 which carries the respective spindles of the loom are each formed with a chamber 2 extending from end to end of said bolster 1 and is provided on its top with upwardly extending ferrules or bearing sleeves 3, which may be screwed into the top of the bolster 1 as illustrated, and in which, and by means of which, the respective end thrust or suspension bearings 4 are suspended and have their lower ends closed and provided with a suitable bearing for the ends of the respective spindles 5, the walls of said bearings 4 being cut away adjacent said lower ends as at 6 to allow the surrounding oil in the reservoir 2 to flow into the interior of the bearings 4.

The oil may be supplied to the reservoir or chamber 2 in any usual known manner, for instance in the same manner as shown in the patent to Tompkins No. 727,715 granted May 12, 1903. However, my invention is not concerned with this, but resides in the combination of the end-thrust or suspension bearing 4 with the ferrule or bearing sleeve 3 and the chambered bolster 1 in such manner broadly, that the bearing 4 will be held firmly in position and suspended by the sleeve 3 and yet may be quickly removed therefrom, whereby all parts protruding or extending substantially into the reservoir of the bolster 1, will be removed, the sleeves 3 being substantially flush with the lower face of the top of the bolster 1 or not extending appreciably into the reservoir so that the reservoir or chamber, with the bearings 4 thus easily removed, will be left free of obstructing parts and so that a mop, swab or other wiping or cleaning device may be passed through the reservoir without obstruction. This construction avoids the objection and great loss of time and work in unscrewing each sleeve 3 or equivalent to remove each bearing 4 or other protruding part to permit unobstructed access to the interior of bolster 1 for the purpose of running a cleaning apparatus therethrough and wiping off the interior thereof.

Further, the special tapered construction of the cooperating surfaces of the bearing 4 and the ferrule or bearing sleeve 3, is such that the former automatically centers itself perfectly in the latter.

Having thus described my invention, what I claim as new and desire to secure by Letters Patent is:

1. For use in a spinning loom of the type having bolsters formed with longitudinally extending oil reservoirs and having their tops bored to receive bearing supporting sleeves extending therethrough, a bearing sleeve secured in one of said bores, having a shoulder adapted to engage the upper face of said top of its respective bolster and having a portion extending in its bore therein and of such length as to be substantially flush with the inner face of said top of said bolster, said sleeve having a bore extending through such portion and communicating with the interior of the bolster, in combination with an endthrust bearing fitting in the bore of said sleeve and extending into said reservoir so as to extend well down into the body of oil therein and perforated to permit the ingress of oil from the said reservoir into said bearing, the said bearing being adapted to receive and support a spindle.

2. For use in a spinning loom of the type having bolsters with longitudinally extending oil reservoirs and having their tops bored to receive spindle bearing supporting sleeves extending therethrough, a bearing sleeve secured in one of said bores, having a shoulder adapted to engage the upper face of its respective bolster and having a portion extending in its bore therein and of such length as not to substantially exceed the thickness of said top portion of said bolster so as to leave the longitudinal reservoir in said bolster unobstructed by said sleeve, said sleeve having a bore extending through such portion and communicating with the interior of said reservoir, in combination with a spindle bearing having a portion larger in cross-section than an internal dimension of a lower portion of said sleeve and freely fitting removably therein and extending down into the lower portion of said reservoir to be immersed in the oil therein, and having its lower portion perforated to permit the ingress of oil from the surrounding body of oil in said reservoir.

3. For use in a spinning loom of the type having bolsters with longitudinally extending oil reservoirs and having their tops bored to receive spindle bearing supporting sleeves extending therethrough, a bearing sleeve secured in one of said bores, having a shoulder adapted to engage the upper face of its respective bolster and having a portion extending in its bore therein and of such length as not to substantially exceed the thickness of the top portion of said bolster so as to leave the longitudinally extending reservoir in said bolster unobstructed by said sleeve, the said sleeve having a smooth faced upwardly flaring central bore forming communication between said reservoir and the atmosphere, in combination with a spindle bearing having a smooth faced downwardly tapering frusto-conical outer face of such size as to snugly fit in the bore of said sleeve to suspend and center said bearing in said sleeve, said bearing having its lower portion perforated and being of such length as to extend into the lower portion of said oil reservoir.

4. A spinning loom bolster having a longitudinally extending interior oil reservoir and having its top portion bored to receive spindle bearing supporting sleeves, a bearing sleeve secured in one of said bores and having a portion extending in said bore and of such length as not to substantially exceed the thickness of said top portion so as not to obstruct the longitudinally extending reservoir, said sleeve having a smooth-faced upwardly flaring central bore, in combination with a removable spindle bearing having its upper portion of downwardly tapering frusto-conical form with a smooth outer face to fit snugly into the bore in said sleeve to be suspended and centered thereby, said bearing having its lower portion perforated and extending into the lower portion of said reservoir and the body of oil therein.

5. A spinning loom bolster having a longitudinally extending interior oil reservoir and having its top portion bored to receive spindle-bearing supporting sleeves, a bearing sleeve secured in one of said bores and having a portion extending in said bore and of such length as not to substantially exceed the thickness of said top portion so as to leave said reservoir unobstructed by said sleeve, said sleeve having an annularly shouldered central bore, in combination with a removable spindle-bearing having its exterior upper portion formed with an annular shoulder to rest on said shoulder in said sleeve to suspend said bearing thereby, said bearing having its lower portion perforated and extending into the lower portion of said oil reservoir.

In testimony whereof, I have signed my name to this specification.

JOSÉ SERRA SIÓ.